United States Patent [19]

Diamond et al.

[11] Patent Number: 5,314,336
[45] Date of Patent: May 24, 1994

[54] TOY AND METHOD PROVIDING AUDIO OUTPUT REPRESENTATIVE OF MESSAGE OPTICALLY SENSED BY THE TOY

[76] Inventors: Mark Diamond, 3495 Mountain, Apt. 701, Montreal, Quebec, Canada, H3G 2A5; Najeeb A. Khalid, 4998 de Maisonneuve ouest, Apt. 1020, Montreal, Quebec, Canada, H3Z 1N2

[21] Appl. No.: 832,868

[22] Filed: Feb. 7, 1992

[51] Int. Cl.⁵ .............................................. G09B 5/00
[52] U.S. Cl. ................................... 434/169; 434/156; 434/393; 446/297; 235/462; 250/221
[58] Field of Search .............. 434/156, 157, 167, 169, 434/185, 308, 317, 318, 355, 393; 446/175, 297, 301, 303; 250/206, 208.2, 208.4, 221; 235/454, 457, 462, 468, 472, 494; 358/474, 481

[56] References Cited

U.S. PATENT DOCUMENTS

| | | | |
|---|---|---|---|
| 3,758,732 | 9/1973 | Myer | 235/470 |
| 3,883,146 | 5/1975 | Johnson et al. | 434/169 X |
| 4,358,278 | 11/1982 | Goldfarb | 434/169 X |
| 4,392,053 | 7/1983 | Bockholt | 235/472 |
| 4,451,911 | 5/1984 | Klose et al. | |
| 4,549,867 | 10/1985 | Dittakavi | 434/169 X |
| 4,560,862 | 12/1985 | Eastman et al. | 235/476 |
| 4,659,919 | 4/1987 | Price | 446/297 X |
| 4,681,548 | 7/1987 | Lemelson | 434/308 X |
| 4,815,733 | 3/1989 | Yokoi | 446/175 X |
| 4,923,428 | 5/1990 | Curran | |
| 4,996,707 | 2/1991 | O'Malley et al. | |
| 5,059,126 | 10/1991 | Kimball | 434/308 |

Primary Examiner—Richard J. Apley
Assistant Examiner—Joe H. Cheng
Attorney, Agent, or Firm—Fishman, Dionne & Cantor

[57] ABSTRACT

A child places a specially marked object in front of a toy capable of recognizing the marks on the object and being able to articulate a word, phrase or sentence in response to the markings. This permits the toy to be able to read and speak. Visible codes, invisible codes or holograms may be located on the objects for this purpose. A mechanism inside the toy is provided to vocalize the sounds associated with each code or marking. Electronic representations of the various sounds vocalized may be stored in the toy or on a removable memory card so that the variety of sounds may be changed as desired. The sounds can be words, sentences, paragraphs, or phonemes. The words can be either spoken or sung.

8 Claims, 6 Drawing Sheets

TOY AND METHOD PROVIDING AUDIO OUTPUT REPRESENTATIVE OF MESSAGE OPTICALLY SENSED BY THE TOY

BACKGROUND OF THE INVENTION

1. Field of the Invention

The invention relates to toys which can detect optical signals and then provide audio outputs related to the detected optical signals.

2. Description of Prior Art

It is known in the art to provide so-called "talking" dolls. Examples of such talking dolls are illustrated in U.S. Pat. No. 4,923,428, Curran, May 8, 1990 and U.S. Pat. No. 4,451,911, Klose et al, May 29, 1984. The '428 patent teaches an interactive talking doll. The doll responds both verbally and with motion of its body parts to a human's verbal input. For this purpose, the doll has a limited word recognition capability. The '911 patent teaches a doll with a plurality of different prerecorded audio messages. Pressing a different switch on the doll will cause the playback of a different one of the recorded messages. The doll can also operate in a problem solution mode.

The prior art also teaches systems for converting visual signals into audio outputs. An example of such a system is illustrated in U.S. Pat. No. 4,996,707, O'Malley et al, Feb. 26, 1991. The O'Malley patent teaches a text to speech converter for a facsimile graphic image.

None of the toys of the prior art known to Applicant can be used for the purpose of teaching recognition skills and providing amusement for a child.

SUMMARY OF INVENTION

It is an object of the invention to provide a toy which can be used to teach recognition skills and provide amusement for a child.

It is a further object of the invention to provide a toy which has the capability of detecting an optical symbol and providing an audio message related to the detected optical symbol.

In accordance with a particular embodiment of the invention there is provided a toy for providing an audio output on detection of any one of a plurality of different optical symbols, comprising:

means in said toy for optically detecting said optical symbols;

audio playback means in said toy for playing back any one of a plurality of different messages;

means for selecting a particular audio message, the particular audio message selected being a function of the particular optical symbol detected;

whereby to establish a relationship between said optical symbols and said audio messages.

In accordance with a further embodiment of the invention there is provided a method of teaching recognition skills, comprising:

providing a toy having means for optically detecting any one of a plurality of optical symbols, and playback means for playing back any one of a plurality of audio messages, a particular message played back being a function of a particular optical symbol detected;

providing objects having optical symbols recorded thereon, the particular optical symbol printed on each object being a function of the characteristics of said object;

placing said toy in a position to optically detect the optical symbols of an object;

playing back a particular audio message on said playback means depending on the particular optical symbol depicted on said object;

whereby, to establish a relationship between said object and said audio message.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
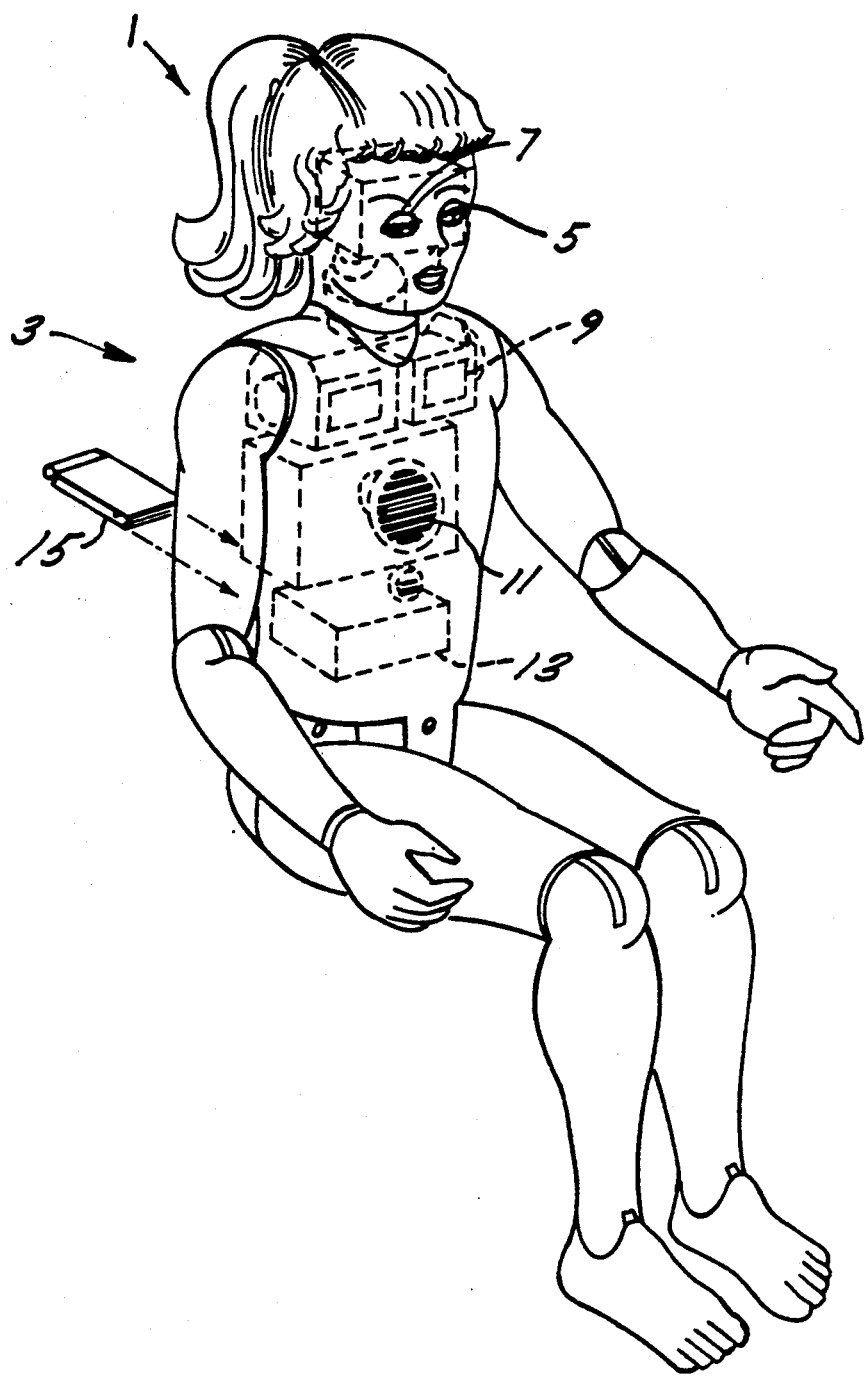
FIG. 1 is a front perspective view of one embodiment of a toy in accordance with the invention.
Figure 2:
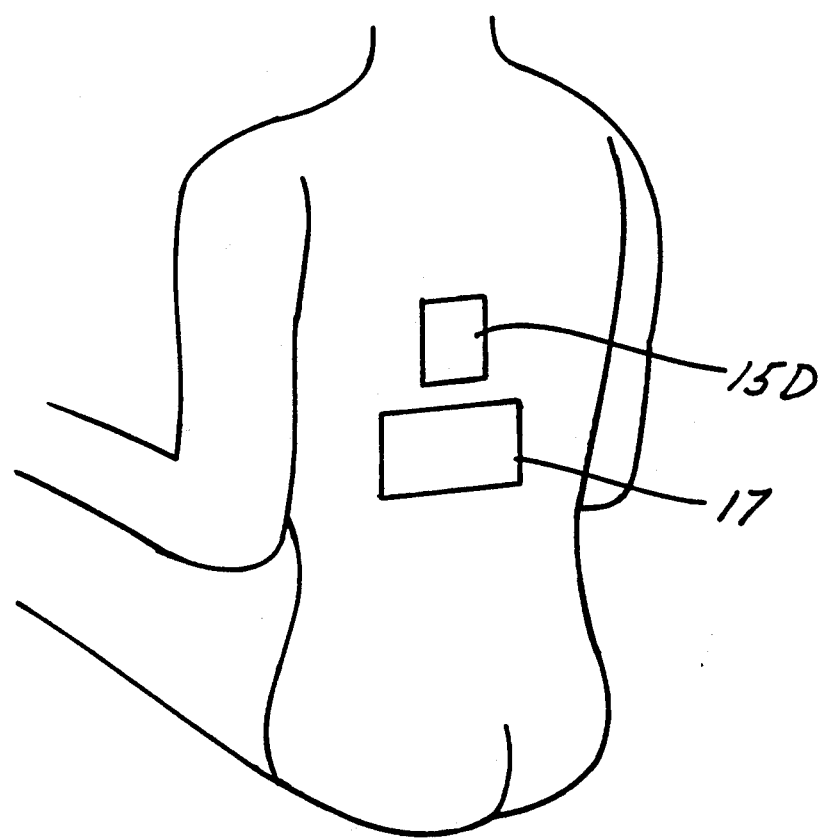
FIG. 2 is a rear perspective view of the same toy.

Referring to FIG. 1, a toy, which in the illustrated embodiment comprises a doll, has a head portion 1 and a body portion 3. The head portion includes a left eye 5 and a right eye 7. Electronics 9, speaker 11 and battery back 13 can be disposed throughout different parts of the body and, as illustrated in FIG. 1, are located in the torso of the doll. In accordance with one embodiment of the invention, a memory card 15 may be inserted into the doll for purposes to be described below, through door 15D seen in FIG. 2. Batteries would be replaced through door 17.

Figure 3:
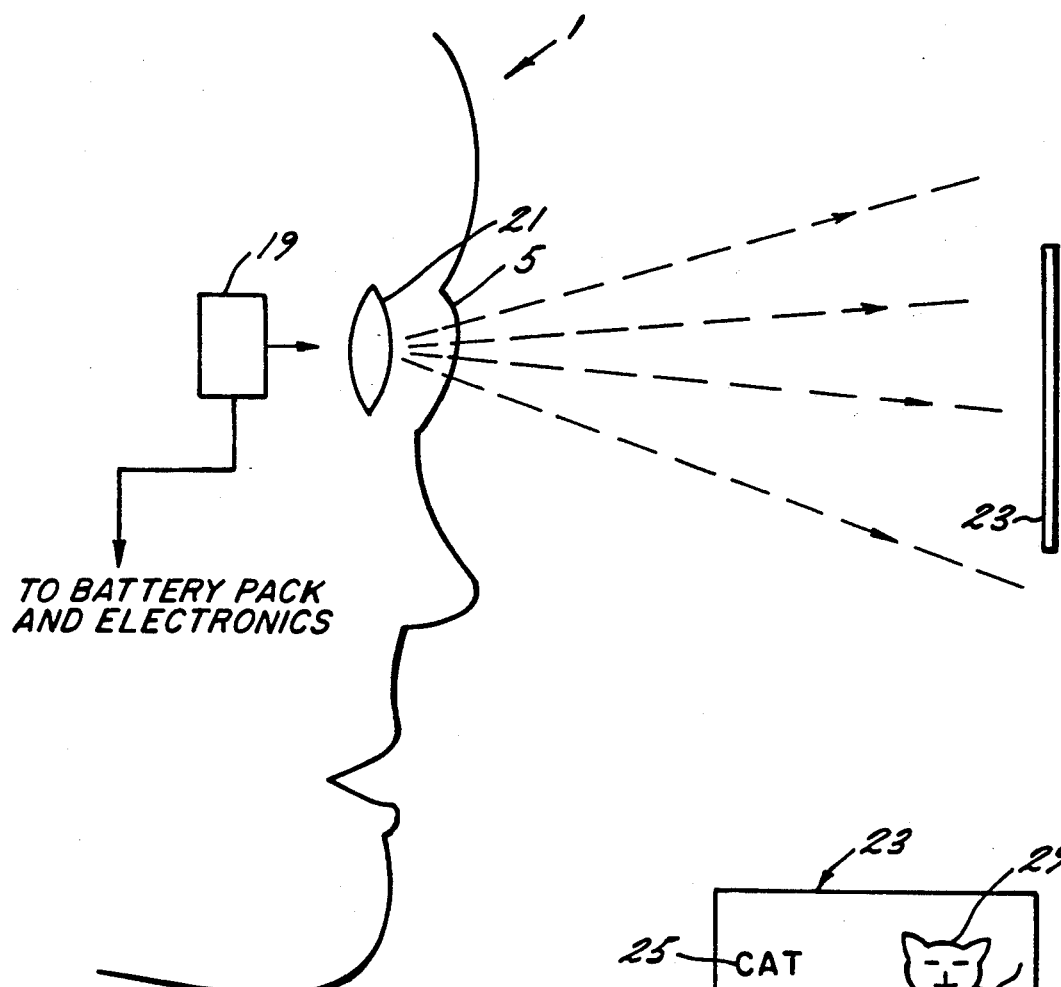
FIG. 3 illustrates a light projection arrangement.

Turning to FIG. 3, behind the left eye 5 of the doll, a radiation source 19, such as a LED, is disposed behind a projection lens 21. Preferably, the LED comprises an IR light output.

Figure 3C:
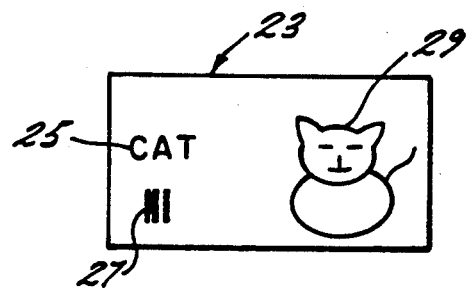
FIGS. 3A, 3B and 3C illustrate different viewing objects in accordance with the invention.
Figure 3B:
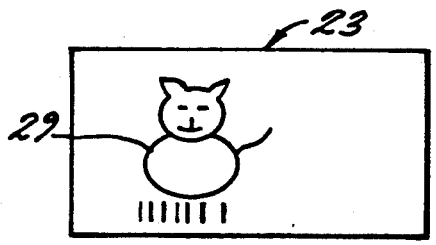
Figure 3A:
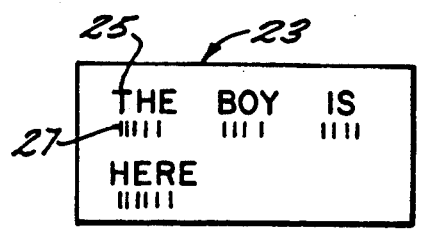

The projection lens 21 directs the output light produced by the LED onto an object 23 to be read. Optical symbols, that is, symbols which can be optically detected such as bar codes, drawings, text or the like, and which may be visible or invisible, are recorded, as by printing or otherwise, on one face of object 23. As can be seen, the projection lens spreads the rays so that the entire object to be read is bathed in the IR light. As seen in FIGS. 3A, 3B and 3C, in a particular embodiment, the objects 23 to be read comprise cards having optical symbols comprising printed material thereon. The printed material can comprise text, along with visible or invisible codes such as bar codes 27 representative of the text 25, a pictorial representation 29 and a code 31 representative of the pictorial representation 29 or both.

Figure 4:
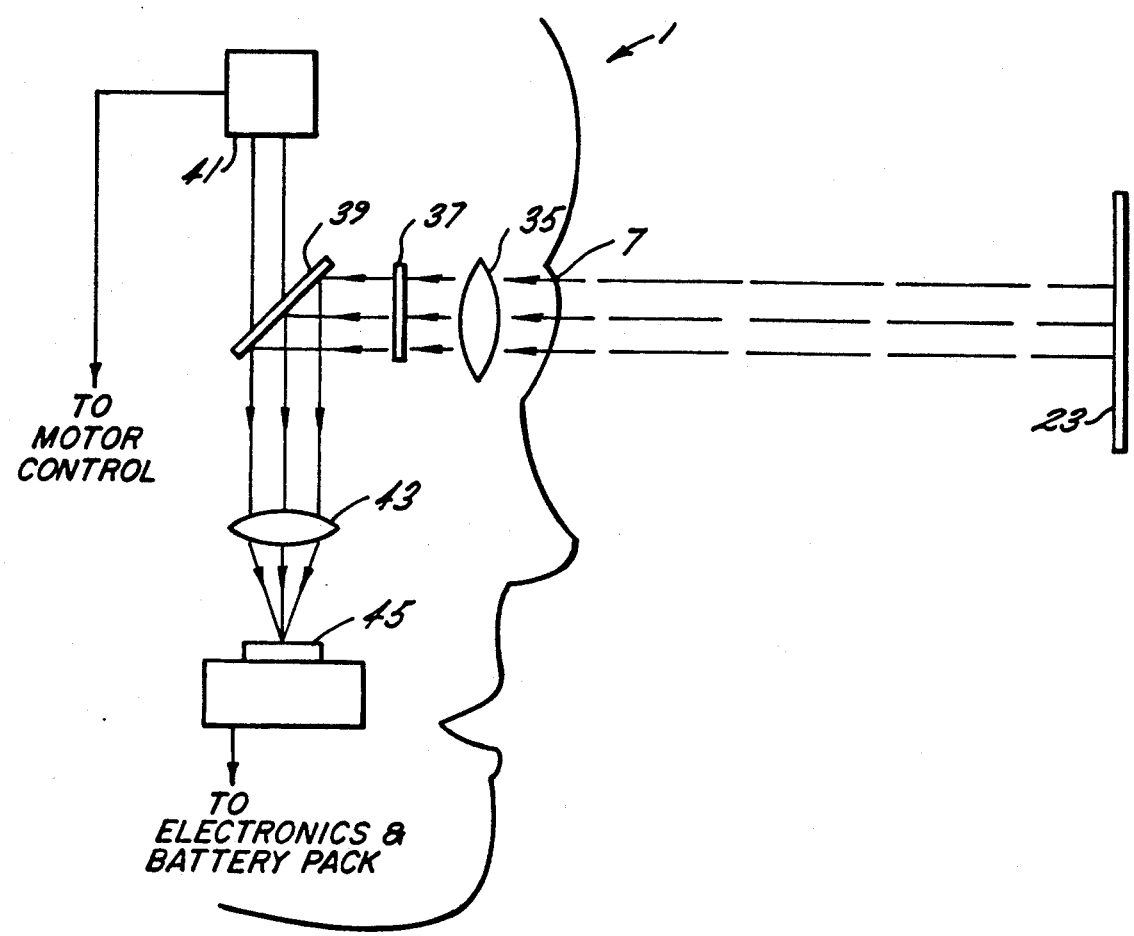
FIG. 4 illustrates a light receiving and detecting arrangement.

Some of the light which is reflected from the object 23 is returned to the right eye 7 of the toy and, as seen in FIG. 4, an optical detection system is disposed behind the right eye 7. The optical detection system comprises a scanning lens 35 followed by an IR filter 37 to filter out light outside of the IR range. A rotating mirror 39 is rotated by a motor 41. The shaft of the motor is disposed at the center of the mirror 39. Light reflected by the mirror 39 is directed to a focusing lens 43 which focuses the light onto an IR detector 45.

Figure 5:
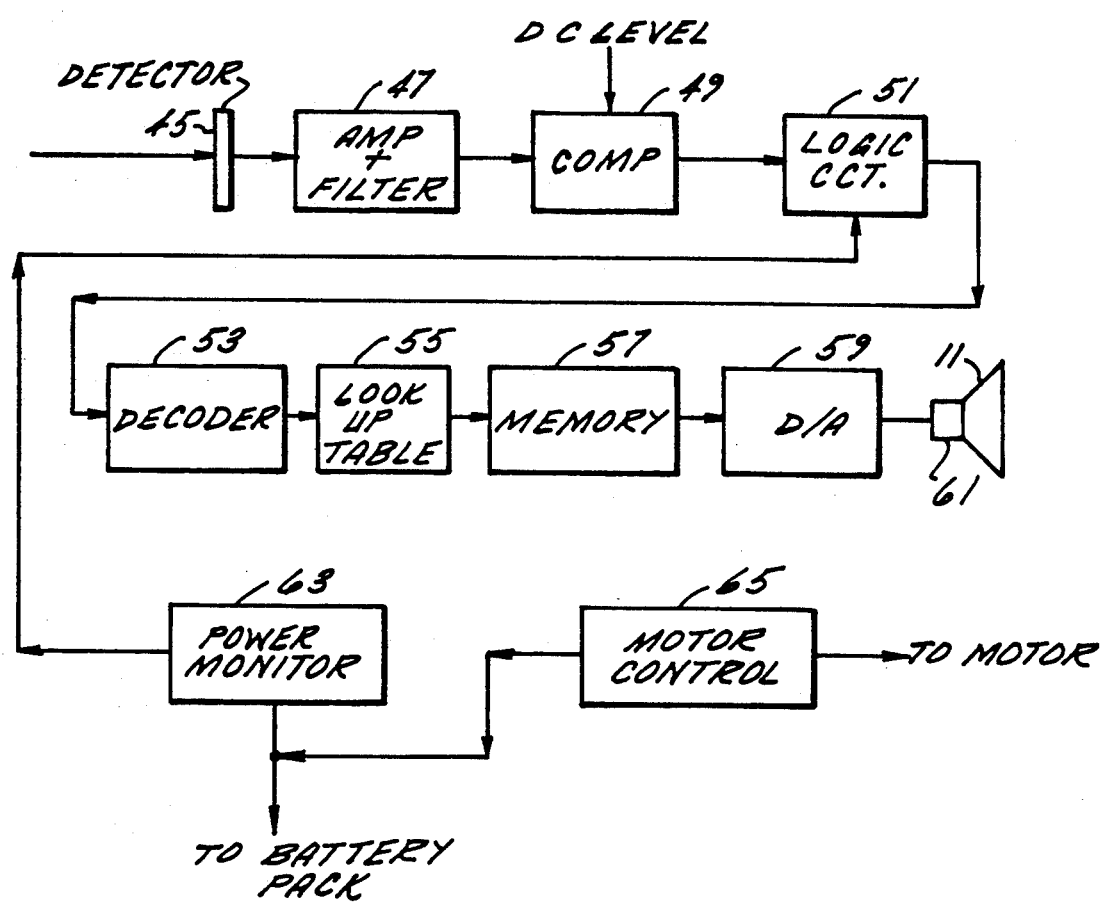
FIG. 5 is a block diagram of circuitry for receiving and analyzing the optical data.

The detected light is then processed in an arrangement as illustrated in FIG. 5. As seen in FIG. 5, the output of the detector 45 is fed to an amplifier and filter 47 whose output is fed to a comparator 49. Fed to a second terminal of the comparator is a DC level which is representative of the ambient light in which the object 3 is located. Thus, the output of the comparator provides levels corresponding to the coded material.

The output of the comparator 49 is fed to a logic circuit 51, and the output of the logic circuit is fed to a decoder 53. The decoded message is provided to a look-up table 55 which points to a location, depending on the code, in a memory 57. The output of the memory, which is a digital signal, is converted to an analog signal in digital-to-analog circuit 59, and the analog signal then drives the speaker 61.

A battery monitor 63 is also provided, and the levels of the battery are fed to the logic circuit to provide messages as will be described below. Motor controller 65 controls the operation of the motor.

In operation, the doll is first turned ON and the object is placed in the field of view of the eyes of the doll. In actual embodiments, the range is from 6 to 18 inches in front of the doll. The object can be mounted on an easel or the like, or in any way supported, and the eyes of the doll are aimed at the object. Light projected by the radiation source is directed at the object, as shown in FIG. 3, and some of this light is reflected back to the optical system.

As seen in FIG. 4, the reflected light passes through the scanning lens 35 and then through the IR filter 37 where all light outside of the IR range is filtered out. Thus, only IR light appears on the other side of the IR filter.

Figure 4A:
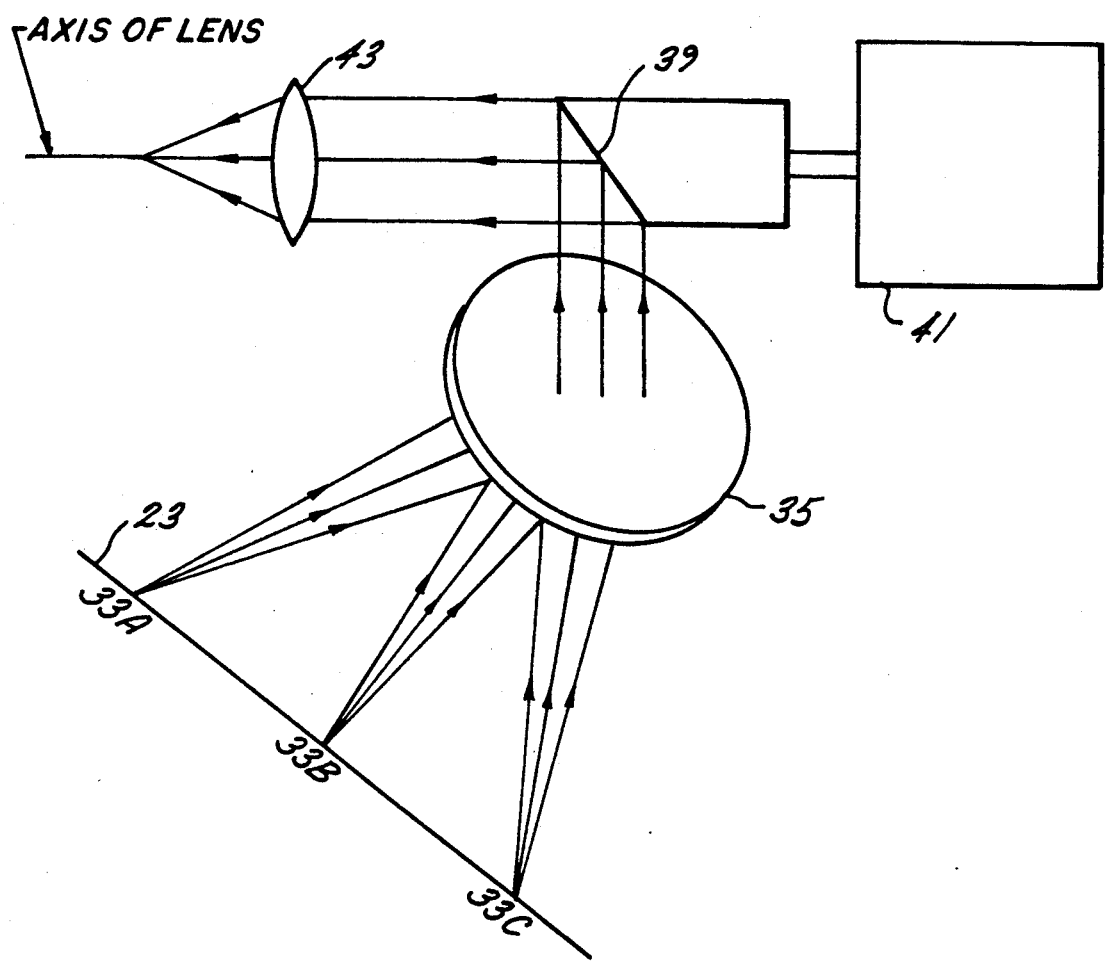
FIG. 4A is provided for a better understanding of the operation of the optical system illustrated in FIG. 4.

The IR light falls on the mirror 39 which is of the first surface type and whose axis of rotation is orthogonal to the incoming IR light. The mirror 39 is mounted such that the plane of the first surface thereof intersects the shaft of the motor 41 at 45 degrees. The effect of the mirror being rotated by the motor is best illustrated in FIG. 4A. As can be seen in FIG. 4A, as the mirror rotates, a different point 33A, 33B, 33C, on the object to be read is reflected off the mirror onto the focusing lens 43. The reflected beam is modulated by the variation of the reflectivity on the surface of the object to be read. This variation in reflectivity is, of course, provided by alternating dark and light areas on a part of the surface of the object to be read, i.e., the bar code portions. The motor rotates at a rate of 10 revolutions per second. This permits the object to be scanned ten times per second.

The focussing lens 43 is placed in the path of the reflected light such that the axis of lens 43 is coincident with the axis of rotation of the motor shaft. The light sensor 45 is disposed at the focal point of the lens 43 so that light reflected from the mirror 39 is focussed onto the light sensor 45.

The light reflected from the 45 degree first surface of the rotating mirror is always a light from a point orthogonal to the axis of the rotating mirror and at a 45 degree angle to the surface of the mirror as per Snells Law. Under Snells Law, the angle of incidence equals the angle of reflection. As the angle of incidence is 45 degrees, the angle of reflection will also be 45 degrees. As the mirror 39 rotates, the point 33 (33A, 33B and 33C, etc.) moves such that a line extending form this point to the center of the mirror describes the plane orthogonal to the axis of the rotation of the motor 41 and the mirror 39. Thus, any variation in the reflectance of an object placed vertical to this plane will be observed as variation in the intensity with time of light reflected in the axis of rotation of the mirror.

The arrangement of the scanning lens 35, IR filter 37, mirror 39, motor 41 and focussing lens 43 and the light sensor 45 allows the variation of reflectivity embedded in the code on the object to be read to be converted to a variation in voltage at the light sensor 45. This arrangement performs the task of scanning the information coded on the object to be converted into electronic signals.

Turning now to FIG. 5, the output of the light sensor is connected to the amplifier and filter 47 whose output is connected to a comparator 49. The DC level of the reflected light is fed to another terminal of the comparator so that the DC level is eliminated from the signal and only variations appear at the output of the comparator 49. Thus, at the output of the comparator, a replica of the variations in intensity appear as variations in voltage. This variation is then provided to the logic circuit 51 which is capable of forming a bit pattern at every revolution of the motor, the bit pattern being the digital information coded on the object to be read.

The output of the logic circuit is fed to a decoder 53 which is programmed to read the output of the logic circuit after each revolution of the motor. If the output remains the same for more than five revolutions, the code is then used to effect a look-up in look-up table 55. This table contains pointers to the address and memory where the compressed data representing the sound to be created on receipt of a particular code is stored. The data is decompressed and provided to a high resolution digital-to-analog converter 59 which in turn drives audio amplifier 61 which in turn drives the speaker 11.

A power monitor 63 is also provided to monitor the power level of the battery pack. The output of the power monitor is fed to the logic circuit and, in one embodiment, when the toy is powered ON, the circuit is driven to provide a "hello" sound at the speaker. If power is low, this embodiment results in a speech "power is low, I will not be able to speak". If some reflected light is received at the sensor but no code is detected, then the speech "I am unable to read, please move the object so I can read it" is repeated at said intervals three times and followed by silence. If no IR light is received at all by the sensor, the speech "what, nothing to read, I am bored" is spoken three times and then silence.

It will of course be obvious to one skilled in the art that the logic circuit 51, the decoder 53, the look-up table 55 and the memory 57 can comprise an appropriately programmed processor. In the latter case, the power monitor and motor control can also comprise program functions of the microprocessor.

In a second embodiment of the invention, each code on a series of codes inscribed on the object to be read will correspond to a different phoneme. The phonemes can, of course, be combined to provide different words so that this embodiment allows the speech to be coded as a series of phonemas providing an extensive variety of speech patterns and thus sentences.

In a still further embodiment, a memory card is inserted through the memory card door 15D, and the memory card may contain the functions of the decoder and the look-up table. With this embodiment, only a particular memory card of a specific kind can be recognized allowing the card to contain different sets of data representations of sounds and/or sentences stored therein. In this latter embodiment, there would be a different card for each class of objects. Each memory card would then hold the words and code translations which are associated with a specific class of objects.

In a still further embodiment, each audio message in one language will be automatically followed by an audio message in another language linked to the same code being detected on the object being read. The replaceable card can store any language including, but not limited to, English, French, Spanish, Japanese, German, Chinese, Hindu and Russian, etc. Several languages can be stored at once and played at once. For example, the toy can say "this is a cat" and then say "c'est un chat".

The voice system can output words or songs and they can be recited in the voice of either a child or an adult who is either male or female. The toy can also be used to read numbers as well as simple mathematical equations such as "5+5=10".

We claim:

1. A toy for teaching recognition skills by providing an audio output on detection of a coded optical signal on one of a plurality of remotely located objects, said toy comprising:
   a plurality of objects which are remotely located and distance apart from said toy, wherein each one of said remotely located object including a different coded optical message and an optical symbol which is associated with said coded optical message, said coded optical message being optically transmitted from said one object to said toy;
   light emitting means in said toy for emitting light so that when said toy is directed at one of said remotely located object, emitted light is reflected from said one of said remotely located object;
   optical detecting means in said toy for optically detecting said emitted light reflected from a coded optical message of said one of said remotely located object, wherein said optical detecting means including
   a rotating mirror optical scanner for optically scanning said emitted light reflected from said coded optical message and for providing optical data representative of said emitted light reflected from said coded optical message;
   data processing means in said toy for analyzing said optical data and for providing an electronic message representative of said optical data;
   audio playback means in said toy comprising means for storing a plurality of different audio messages, and means for playing back a selected one of said audio messages; and
   means in said toy for selecting a particular one of said audio messages, said means for selecting being activated by said electronic message, whereby said selected audio message is a function of the particular coded optical message detected so as to establish a relationship between an optical symbol and a related one of said audio messages.

2. A toy as defined in claim 1 wherein said coded optical message is optically transmitted to said toy by ambient light.

3. A toy as defined in claim 1 wherein said coded optical message is optically transmitted to said toy by said reflected light.

4. A toy as defined in claim 1 wherein said means for storing comprises memory means.

5. A toy as defined in claim 1 wherein said remotely located objects comprise cards, said optical symbols comprise pictures, and said coded optical messages comprise bar codes.

6. A method for teaching recognition skills by using a toy and a selected one of a plurality of objects, each one of said plurality of objects having different optical symbols and coded optical message associated with said optical symbols thereon, said toy providing an audio output on detection of a particular coded optical message on a particular object, said audio output related to the nature of said particular optical symbol on said particular object; said toy including:
   light emitting means in said toy for emitting light so that when said toy is directed at one of said plurality of object, emitted light is reflected from said one of said plurality of object;
   optical detecting means in said toy for optically detecting said emitted light reflected from said coded optical message of said one of said plurality of object, wherein said optical detecting means including
   a rotating mirror optical scanner for optically scanning said emitted light reflected from said coded optical message and for providing optical data representative of said emitted light reflected from said coded optical message;
   data processing means in said toy for analyzing said optical data and for providing an electronic message representative of said optical data;
   audio playback means in said toy comprising means for storing a plurality of different audio messages, and means for playing back a selected one of said audio messages; and
   means in said toy for selecting a particular one of said audio messages, said means for selecting being activated by said electronic message, whereby said selected audio message is a function of the particular coded optical message detected; said method including the steps of:
   remotely locating a selected one of said objects distance apart from said toy; and
   positioning said toy to optically receive the particular coded optical message on said selected objects;
   whereby said coded optical message is optically detected by said optical detecting means by optically scanning said coded optical message to provide optical data representative of said coded optical message, and by analyzing said optical data in said data processing means to provide said electronic message representative of said coded optical message;
   said toy subsequently selecting a particular audio message by actuating said means for selecting with said electronic message whereby said selected audio message is a function of the particular coded optical message detected so as to establish a relationship between an optical symbol and a related one of said audio messages.

7. A method as defined in claim 6 wherein said coded optical message is optically transmitted from said object to said toy by ambient light.

8. A method as defined in claim 6 wherein said coded optical message being optically transmitted to said toy by said reflected light.

* * * * *